United States Patent [19]
McCann et al.

[11] Patent Number: 5,932,964
[45] Date of Patent: Aug. 3, 1999

[54] EUROPIUM-CONTAINING GROUP IIA FLUORIDE EPITAXIAL LAYER ON SILICON

[75] Inventors: Patrick J. McCann; Xiao-Ming Fang; Tathagata Chatterjee, all of Norman, Okla.

[73] Assignee: McCann & Associates, Inc., Norman, Okla.

[21] Appl. No.: 08/929,577

[22] Filed: Sep. 15, 1997

Related U.S. Application Data

[60] Provisional application No. 60/026,635, Sep. 24, 1996.

[51] Int. Cl.$^6$ .................................................. H01J 1/62
[52] U.S. Cl. ........................ 313/498; 313/506; 313/509; 252/521.1
[58] Field of Search .................................. 313/498, 506, 313/509; 252/521.1

[56] References Cited

U.S. PATENT DOCUMENTS

| | | | |
|---|---|---|---|
| 5,384,795 | 1/1995 | Cho | 372/7 |
| 5,543,237 | 8/1996 | Watanabe | 428/691 |
| 5,552,667 | 9/1996 | Cho et al. | 313/498 |

OTHER PUBLICATIONS

Sokolov et al., Sov. Phys. Solid State 31(2), 1989, 216–218.

Miura et al., Jpn. J. Appl. Phys. 31, 1992, L46–L48.

*Primary Examiner*—Sandra O'Shea
*Assistant Examiner*—Michael J. Smith
*Attorney, Agent, or Firm*—Florence Fusco McCann

[57] ABSTRACT

A light-emitting, specifically electroluminescent, europium-containing Group IIA fluoride epitaxial layer on silicon with a europium concentration in the range of from about 4 to about 40 wt % and a molecular beam epitaxy method for growth thereof are provided. Also provided is a light-emitting, specifically electroluminescent, device including a europium-containing Group IIA fluoride epitaxial layer on silicon with a europium concentration in the range of from about 4 to about 40 wt %. The Group IIA fluoride layer exhibits electroluminescence in the wavelength range of from about 450 to about 700 nm.

10 Claims, 3 Drawing Sheets

EUROPIUM-CONTAINING GROUP IIA FLUORIDE EPITAXIAL LAYER ON SILICON

This application claims the benefit of U.S. Provisional Application No. 60/026,635, filed Sep. 24, 1996.

The United States Government has rights in this invention based on grants OSR 9108771 and OSR 9550478 from the National Science Foundation EPSCOR.

BACKGROUND OF THE INVENTION

1. Field of the Invention

The invention relates to a europium-containing Group IIA fluoride epitaxial layer on silicon where the europium concentration is in the range of from about 4 to about 40 wt %.

2. Description of the Prior Art

Many electronic devices such as pagers, cellular telephones, and personal digital assistants include as one of their components a visual display user interface. Presently, a common visual display user interface utilizes liquid crystal display (LCD) technology. Liquid crystals are typically complex organic molecules that do not generate their own light; hence, they require a separate light source such as a high intensity back-light source. Furthermore, the liquid crystals must be contained within a glass display unit, separate from the electronic components of the device. A liquid crystal display cannot be fabricated directly on a silicon substrate and, therefore, a liquid crystal display and device electronic components cannot be integrated on the same chip.

Thus, there exists a need for a light-emitting layer that can be grown directly on a silicon substrate to allow integration of a light emitting display on the same chip as device electronics, and for a light-emitting device including such a layer. Also required is a method for making the light-emitting layer.

SUMMARY OF THE INVENTION

The invention provides a europium-containing Group IIA fluoride epitaxial layer on silicon where the europium concentration is in the range of from about 4 to about 40 wt % and to a molecular beam epitaxy method for making the layer. The epitaxial layer can, under conditions appropriate for electroluminescence, emit light having a wavelength in the range of from about 450 to about 700 nm.

Also provided is a light-emitting, specifically electroluminescent in the wavelength range of from about 450 to about 700 nm, device including a europium-containing Group IIA fluoride epitaxial layer on silicon where the europium concentration is in the range of from about 4 to about 40 wt %.

An object of this invention is to provide a light-emitting, specifically electroluminescent, europium-containing Group IIA fluoride epitaxial layer on silicon where the europium concentration is in the range of from about 4 to about 40 wt % that can be grown directly on a silicon substrate, thereby allowing integration of electronic components with a light-emitting display on the same chip.

Other and further objects, features, and advantages of the present invention will be readily apparent to those skilled in the art upon reading the description of the preferred embodiments which follows.

DESCRIPTION OF PREFERRED EMBODIMENTS

Figure 1:
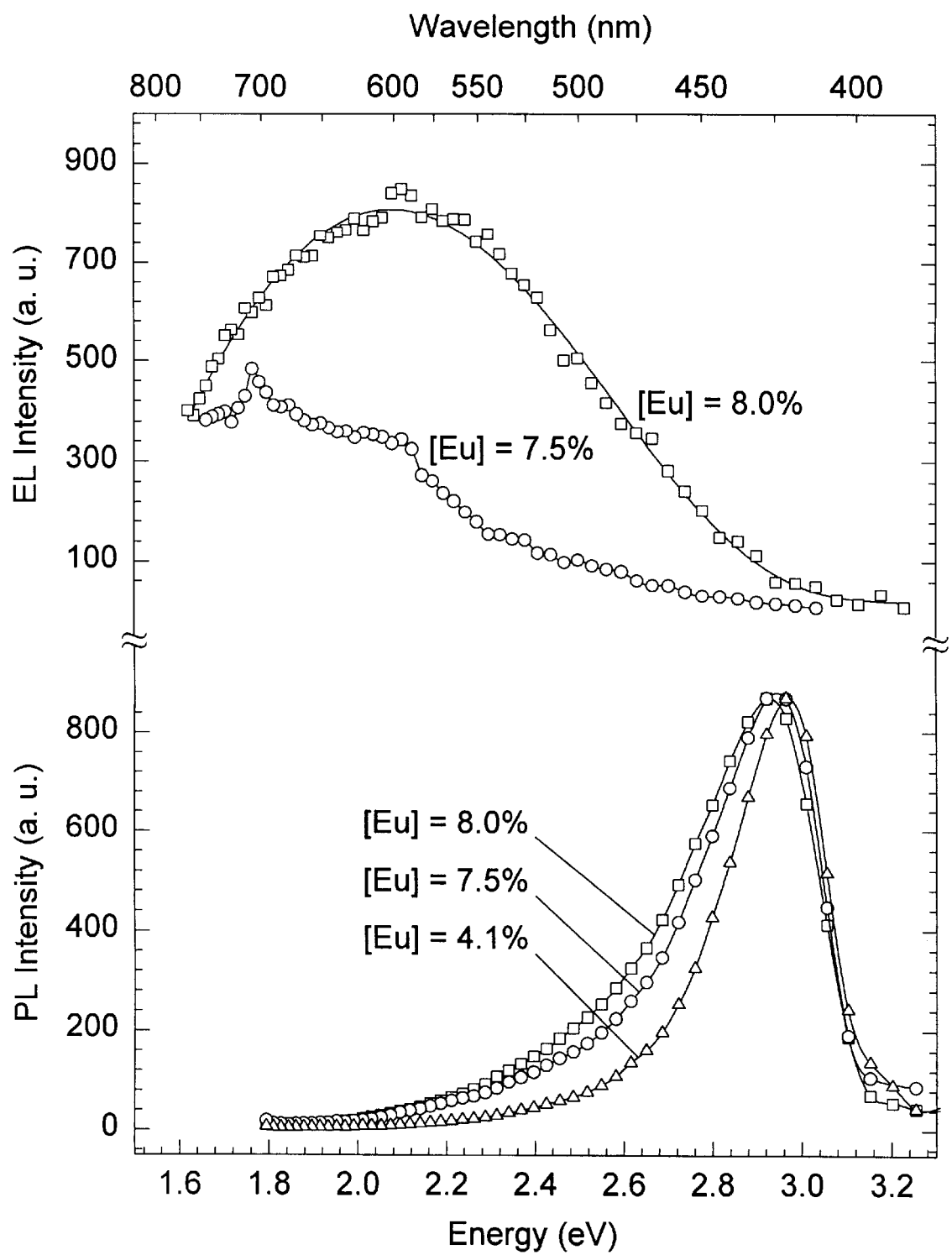
FIG. 1 shows electroluminescence (EL) spectra of europium-containing calcium fluoride (Eu:CaF$_2$) layers containing 7.5 and 8.0 wt % Eu and normalized PL spectra of 4.1, 7.5 and 8.0 wt % Eu Eu:CaF$_2$ layers.

In the europium-containing Group IIA fluoride epitaxial layer on silicon with europium concentration in the range of from about 4 to about 40 wt %, the europium content can be selected so that the europium is present as precipitates of elemental europium. These europium precipitates can be discrete or contiguously interconnected within the Group IIA fluoride matrix. The Group IIA element can be chosen from among the elements Mg, Ca, Ba or Sr or mixtures thereof.

The term "epitaxial layer" as used herein in the specification and following claims refers to a crystalline layer of material and can be characterized by a thickness in the range of from about 200 nm to about 1000 nm.

Such a europium-containing Group IIA fluoride epitaxial layer where the europium concentration is in the range of from about 4 to about 40 wt % can be advantageously grown on silicon using molecular beam epitaxy. Molecular beam epitaxy is a thin film deposition method involving the exposure of a heated substrate, such as silicon, to a flux of molecules or atoms in a high vacuum environment such that material is grown on the substrate in a layer-by-layer fashion, the details of which are well known to one skilled in the art of epitaxial crystal growth. A molecular beam epitaxy method for making a Group IIA fluoride europium containing epitaxial layer on silicon where the europium concentration is in the range of from about 4 to about 40 wt % can include steps of (a) providing a Group IIA fluoride source; b) providing an elemental Eu source separately from the Group IIA fluoride source; (c) providing a substrate; and (d) evaporating the Group IIA fluoride and Eu sources to deposit the layer on the substrate. A step (e) of annealing the deposited layer of step (d) can also be performed. Annealing steps can electrically activate the Eu, create Eu precipitates, or improve layer crystallinity and morphology or provide any combination of the above-mentioned effects.

An electroluminescent device emitting light with a wavelength in the range of from about 450 to about 700 nm can include an electroluminescent active layer further including a europium-containing Group IIA fluoride epitaxial layer on silicon where the europium concentration is in the range of from about 4 to about 40 wt %; a silicon substrate and a contact for injection of charge carriers into the electroluminescent active layer. The contact is in electrical contact with the electroluminescent active layer. Depending upon the configuration of the device, the charge carriers can be electrons, holes, ions or a mixture thereof. The silicon substrate can have an acceptor concentration in the range of from about $1\times10^{14}$ cm$^{-3}$ to about $1\times10^{16}$ cm$^{-3}$.

The foregoing device can include a europium-containing Group IIA fluoride epitaxial layer on silicon where the europium concentration is preferably in the range of from about 4 to about 20 wt % and more preferably in the range of from about 4 to about 10 wt %.

The contact can include a semi-transparent layer of a metal such as CrAu, Al, Cu, W, or Ti or can be a transparent conductive layer such as zinc oxyfluoride, indium tin oxide, or zinc selenide. The exact composition of the contact layer and the method whereby it is deposited can be selected according to the specific operating requirements of the device based on criteria well-known to one skilled in the art of light-emitting device fabrication.

Figure 3:
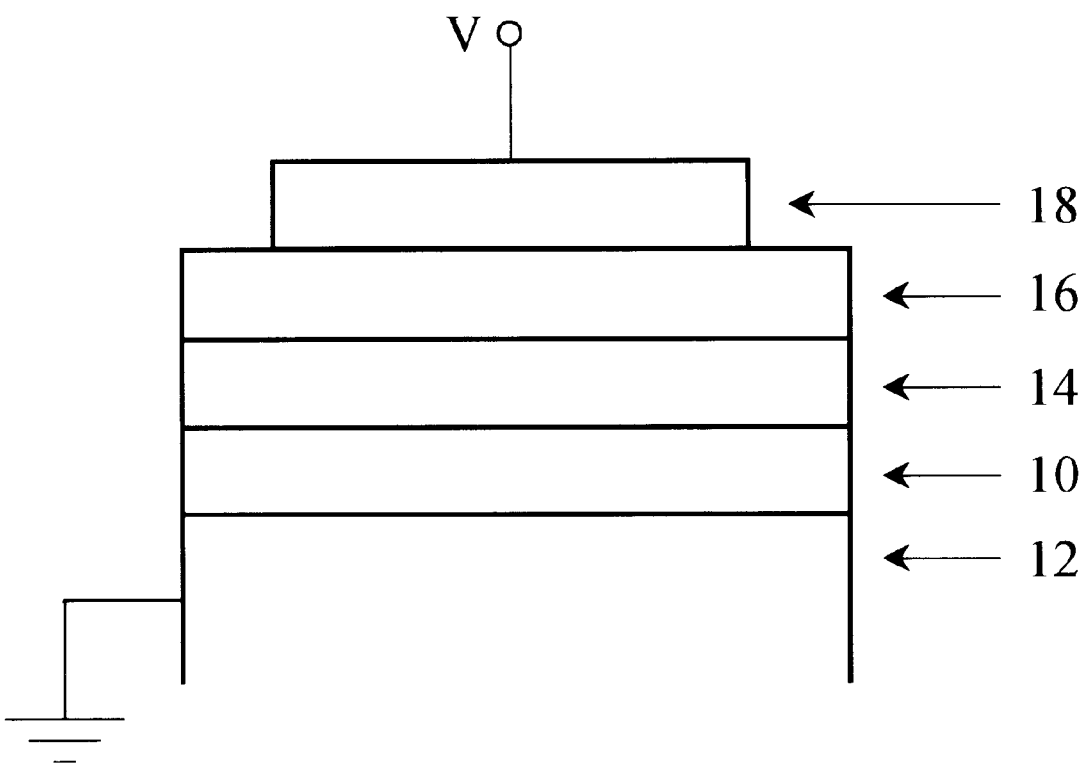
FIG. 3 shows an electroluminescent device.

The light-emitting device in FIG. 3 can further include a buffer 10 layer between the silicon substrate 12 and the electroluminescent active layer 14 and a cap layer 15 between the electroluminescent active layer 14 and the contact 18. The cap layer can be any thin film electrically insulating dielectric material such as oxides, sulfides, selenides, or nitrides including silicon dioxide, titanium dioxide, tantalum pentoxide, zinc sulfide, zinc selenide, silicon nitride, or titanium nitride The light emitting device previously described can be a component in a visual display system. The light-emitting device can also be an optical data transmitter capable of transmitting data through optical interconnections, fiber optics or free-space.

EXAMPLE 1

The following example demonstrates room temperature visible electroluminescence using MBE-grown Eu:CaF$_2$ layers on silicon which produce visible luminescence peaked at around 600 nm. The ability to generate this luminescence using relatively small DC voltages (less than 25 volts) makes this system promising for optical devices based on silicon. The example also shows that high concentrations of rare earth ions can be incorporated into MBE-grown CaF$_2$, perhaps because low MBE growth temperatures inhibit rare earth ion clustering.

The Eu:CaF$_2$ layers studied were grown by MBE on lightly doped (3–7 ohm-cm) p-type Si(100) substrates as described previously. The layer structure includes a 400 Å CaF$_2$ buffer layer, a 3600 Å Eu:CaF$_2$ layer and a 200 Å CaF$_2$ cap layer. Eu was incorporated into the Eu:CaF$_2$ layer using a separate effusion cell, allowing variation of the Eu concentration by varying the Eu cell temperature. The substrate temperature was kept at 580° C. during growth, and the growth rate was 20 Å per minute. An in-situ post-growth anneal at 1100° C. was carried out for 2 minutes to improve the surface morphology and crystallinity of the samples. The concentration of Eu in the samples was determined using Eu to CaF$_2$ beam flux ratios and confirmed using X-ray-photoelectron-spectroscopy (XPS).

Samples, containing 0, 1.0, 4.1, 7.5 and 8.0 wt % Eu, were prepared for electrical studies by thermally evaporating 450×450 $\mu$m$^2$ Cr/Au (100 Å of Cr and 2400 Å of Au) contacts onto the layer structure using a shadow mask. The back sides of the Si substrates were completely metallized with thermally evaporated aluminum. Following metallization, the samples were annealed in forming gas (80% N$_2$, 20% H$_2$) for 20 minutes at 450° C. Samples for electroluminescence (EL) studies were prepared by depositing (using DC magnetron sputtering with an Ar plasma) transparent conducting indium-tin-oxide (ITO) contacts either on the bare CaF$_2$ surface (for the 7.5% Eu layer) or onto a CaF$_2$ surface covered with approximately 100 Å of thermally evaporated aluminum (for the 8.0% Eu layer). The substrate was kept at 230° C. during the sputtering process and the Ar background pressure was 26 mTorr. The ITO layers were ~2500 Å thick with a sheet resistance of 12 Ohm/cm and >80% transmittance over the spectral range in which the EL spectra were obtained. Electrical contact was made to the ITO layer using Pt/Ir probes and the back side (Si substrate) was mounted onto a copper plate with silver paint.

Room temperature photoluminescence (PL) spectra were obtained for Eu:CaF$_2$ samples containing 4.1, 7.5 and 8.0% Eu, using the 365 nm line of an Hg lamp as the excitation source. PL spectra from the same samples excited with the 253.7 nm Hg line did not show any features that were different from the 365 nm excitation. The collimated light from the samples (for both the PL and EL spectra) was optically chopped and coupled to a 0.25 m grating monochromator. A Hamamatsu H5704-01 PMT (long wavelength cut-off at 750 nm) connected to a lock-in amplifier was used to record the spectra. Both the EL and PL spectra were corrected for the spectral response of the measurement system which was determined using the measured versus known spectra of a 3200 K black body source.

FIG. 1 shows EL spectra for 7.5 and 8.0 wt % Eu samples along with normalized PL spectra for 4.1, 7.5 and 8.0 wt % Eu samples. The EL spectrum of the 7.5 wt % Eu sample was obtained with the ITO electrode held at +14 volts relative to the substrate and an injection current of 465 mA, while the 8.0 wt % Eu EL spectrum was obtained with the ITO/Al contact held at −18.5 volts relative to the Si substrate and an injection current of 240 mA. Note that the 8.0% Eu sample exhibits more intense EL than the 7.5 wt % Eu sample at about half the current level (240 mA versus 465 mA).

Figure 2:
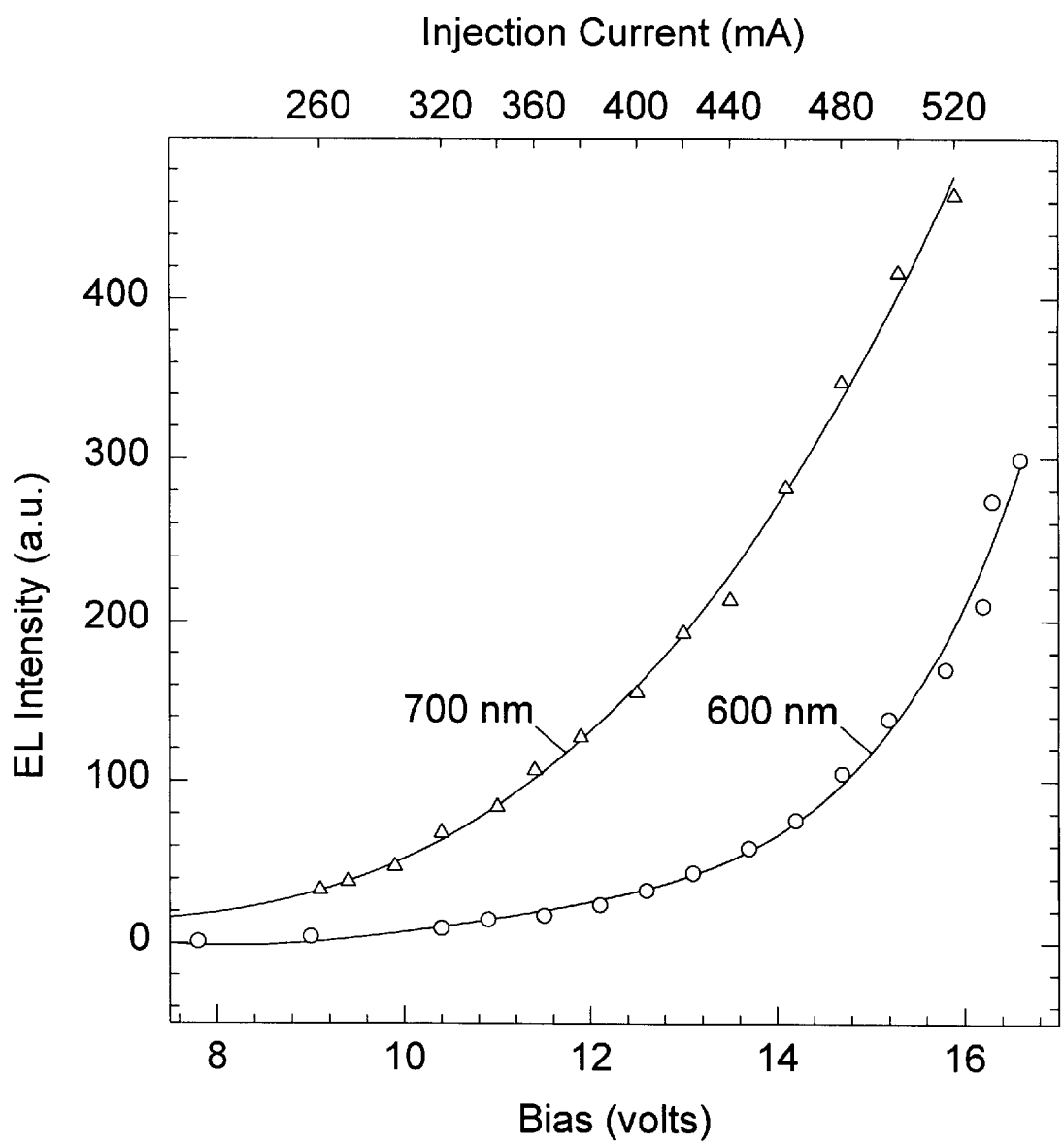
FIG. 2 shows EL intensity versus bias for a Eu:CaF$_2$ layer containing 7.5 wt % Eu monitored at 600 nm and 700 nm.

FIG. 2 shows EL intensities at 600 nm and 700 nm for the sample containing 7.5 wt % Eu as a function of bias voltage. It can be seen that EL emission at 700 nm occurs at lower voltages. This sample was tested with the ITO contact biased positive relative to the Si substrate. Although injection current was similar, reversing the polarity of the bias resulted in no detectable optical signal. By contrast, the EL device with ITO/Al contact on the 8.0 wt % Eu samples produced bright EL with contact biased negative relative to the Si substrate while reversing the polarity produced very faint EL.

EL structures were also fabricated with semi-transparent Cr/Au and Al contacts. However the EL intensity from these structures was not stable as compared to the ones with the ITO or ITO/Al contacts, which have been operated for over 24 hours (cumulative) at a current injection of 240 mA without any measurable degradation in EL intensity or change in the EL spectrum.

What is claimed is:

1. An electroluminescent device comprising:

(a) a (100)-oriented silicon substrate;

(b) an electroluminescent active layer including a Group IIA fluoride epitaxial layer further including europium wherein said europium is present in a concentration in the range of from about 4 to about 40 wt % exhibiting electroluminescence at a wavelength in the range of from about 450 to about 700 nm; and (c) a contact for injection of charge carriers into said electroluminescent active layer in electrical contact with said electroluminescent active layer.

2. The device of claim 1 wherein said silicon substrate has an acceptor concentration in the range of from about 1×10$^{14}$ cm$^{-3}$ to about 1×10$^{16}$ cm$^{-3}$.

3. The device of claim 1 wherein said Group IIA element is selected from the group consisting of Mg, Ca, Ba, Sr and mixtures thereof.

4. The device of claim 1 wherein said europium concentration is in the range of from about 4 to about 20 wt %.

5. The device of claim 1 wherein said europium concentration is in the range of from about 4 to about 10 wt %.

6. The device of claim 1 wherein said contact includes a semi-transparent layer of a metal selected from the group consisting of CrAu, Al, Cu, W, and Ti.

7. The device of claim 1 wherein said contact is a transparent conductive layer selected from the group consisting of zinc oxyfluoride, indium tin oxide, and zinc selenide.

8. The device of claim 1 further including an electrically insulating buffer layer between said substrate and said electroluminescent active layer and an electrically insulating cap layer between said electroluminescent active layer and said contact.

9. The device of claim 1 wherein said device is a component of a visual display system.

10. The device of claim 1 wherein said device is an optical data transmitter.

* * * * *